(12) United States Patent
Unno et al.

(10) Patent No.: US 7,878,542 B2
(45) Date of Patent: Feb. 1, 2011

(54) AIRBAG DEVICE

(75) Inventors: Masato Unno, Fuji (JP); Aki Yokoyama, Fuji (JP)

(73) Assignee: Nihon Plast Co., Ltd., Fuji-Shi (JP)

( * ) Notice: Subject to any disclaimer, the term of this patent is extended or adjusted under 35 U.S.C. 154(b) by 186 days.

(21) Appl. No.: 12/361,799

(22) Filed: Jan. 29, 2009

(65) Prior Publication Data

US 2009/0189379 A1   Jul. 30, 2009

(30) Foreign Application Priority Data

Jan. 30, 2008   (JP) ............................. 2008-019177

(51) Int. Cl.
*B60R 21/239* (2006.01)
*B60R 21/276* (2006.01)

(52) U.S. Cl. .................................. 280/743.2; 280/739
(58) Field of Classification Search ............. 280/743.2, 280/739
See application file for complete search history.

(56) References Cited

U.S. PATENT DOCUMENTS

| | | | | |
|---|---|---|---|---|
| 6,513,835 | B2 * | 2/2003 | Thomas | 280/743.2 |
| 6,773,030 | B2 * | 8/2004 | Fischer | 280/739 |
| 6,918,611 | B1 * | 7/2005 | Winters et al. | 280/735 |
| 7,275,763 | B2 * | 10/2007 | Thomas et al. | 280/743.2 |
| 7,597,355 | B2 * | 10/2009 | Williams et al. | 280/739 |
| 7,597,356 | B2 * | 10/2009 | Williams | 280/739 |
| 7,614,653 | B2 * | 11/2009 | Rose et al. | 280/739 |
| 7,686,333 | B2 * | 3/2010 | Choi | 280/743.2 |
| 2006/0192370 | A1 * | 8/2006 | Abe et al. | 280/735 |
| 2008/0023950 | A1 * | 1/2008 | Kalczynski et al. | 280/739 |
| 2008/0315567 | A1 * | 12/2008 | Fischer et al. | 280/732 |
| 2009/0033081 | A1 * | 2/2009 | FIischer et al. | 280/743.2 |
| 2010/0078924 | A1 * | 4/2010 | Mitsuo et al. | 280/743.2 |
| 2010/0109303 | A1 * | 5/2010 | Abe et al. | 280/739 |

FOREIGN PATENT DOCUMENTS

JP    2005-14863 A    1/2005

\* cited by examiner

*Primary Examiner*—Paul N Dickson
*Assistant Examiner*—Drew Brown
(74) *Attorney, Agent, or Firm*—NDQ&M Watchstone LLP

(57) ABSTRACT

An airbag device includes an airbag, an adjusting unit capable of adjusting an aperture efficiency of at least one vent hole, a tether belt whose one end is connected to the adjusting unit, and a holding unit for hooking another end of the tether belt. In case where the inflating airbag needs to exert a small reactive force, the adjusting unit is made in a full-opened state at a development early stage with the other end being held by the holding unit and then made in a half-opened until a development final stage with the other end being kept held by the holding unit. In case where the inflating airbag needs to exert a large reactive force, the adjusting unit is made in a full-closed state from a development start to the development final stage with the other end being released from the holding unit.

5 Claims, 7 Drawing Sheets

AIRBAG DEVICE

BACKGROUND OF THE INVENTION

1. Field of the Invention

The present invention relates to an airbag device having an inner pressure adjusting unit that can adjust an inner pressure of an airbag thereof.

2. Description of Related Art

Conventionally, a vehicle such as automobile is provided with an airbag device to protect a passenger(s) from an impact in a vehicle collision.

With regard to the airbag device, various types are provided such as one for protecting a passenger seating on a rear seat and one for protecting a passenger from an impact in a side collision or a roll-over in addition to one for protecting a passenger seating on a driver's seat or a front passenger's seat. Although an airbag shape or the like may be varied according to an installed position, most of airbags have a configuration for inflating and developing a bag-like airbag by high-pressure gas generated by an inflator at a vehicle collision to protect a passenger(s) from a collision impact by absorbing the collision impact by the airbag.

Since the conventional airbag device inflates the airbag in a blink by the high-pressure gas generated by the inflator and then develops the airbag in a prescribed direction, the airbag may contact with a passenger seating near the airbag device or the like at a development early stage.

Therefore, an airbag device for a vehicle had been proposed, which can reduce an impact by adjusting an inflating pressure of its airbag by preliminarily detecting a state where a passenger or the like is seating near the airbag device at a development early stage or by generating high-pressure gas by one inflator at a development early stage and then by other inflators to develop an airbag into a prescribed shape.

Another airbag device had been proposed, which restricts an inner pressure elevation at an inflation early stage and then raise the inner pressure up to a sufficient high-pressure after a passenger being restrained by its airbag (e.g. Patent Document 1: Japanese Patent Application Laid-Open No. 2005-14863).

In the airbag device, an adjusting means is provided near vent holes of its airbag, which allows a gas ejection from the vent holes at a development early stage of the airbag.

The vent holes are closed by the adjusting means according to a deploying condition of the airbag to cut off gas ejection from the vent holes after transition from the development early stage to a development subsequent stage.

Since some of gas within the airbag is ejected from the vent holes at the development early stage of the airbag, an impact at the development early stage can be reduced.

Since the vent holes are closed by the adjusting means according to a deploying condition of the airbag after the transition from the development early stage to the development subsequent stage and then an inner pressure of the airbag rises quickly, the passenger can be restrained firmly due to an inner pressure of the airbag that has risen sufficiently when the passenger has been restrained by the airbag.

SUMMARY OF THE INVENTION

However, in the airbag device that adjust a inflating pressure of its airbag by preliminarily detecting a state where a passenger or the like is seating near the airbag device at a development early stage, the device tends to be complicated and high-cost because it must be needed to adjust opening area of a vent hole(s) of its airbag by an electromagnetic open/close means or to provide a detecting means for detecting the passenger or the like.

On the other hand, in the airbag device shown in the Patent Document 1, although an impact can be reduced at the development early stage of the airbag due to the vent holes being opened, a large-capacity inflator must be needed due to incrementation of gas loss. Therefore, the airbag device tends to become large, heavy and high-cost.

In addition, restraining performance at the development early stage may be similarly weakened when an object such as a baggage is put on a passenger's seat without fastening it with a seat belt or a large object is put near the airbag device.

Therefore, it is an object of the present invention to provide an airbag device that can adjust an inner pressure of its airbag according to a state of an object to be protected such as whether or not the object is fastened with a seat belt.

An aspect of the present invention is to provide an airbag device that includes an airbag to be inflated and deployed toward a passenger by high-pressure gas ejected from an inflator upon a vehicle collision, an inner pressure adjusting unit provided on the airbag and capable of adjusting an aperture efficiency of at least one vent hole in plural steps according to a deploying state of the airbag, a tether belt whose one end is connected to the inner pressure adjusting unit, and a holding unit for hooking another end of the tether belt and capable of releasing the other end of the tether belt. In case where the inflating airbag needs to exert a small reactive force, the inner pressure adjusting unit is made in a full-opened state at a development early stage of the airbag with the other end of the tether belt being held by the holding unit and then the inner pressure adjusting unit is made in a half-opened until a development final stage of the airbag with the other end of the tether belt being kept held by the holding unit. In case where the inflating airbag needs to exert a large reactive force, the inner pressure adjusting unit is made in a full-closed state from a development start to the development final stage of the airbag with the other end of the tether belt being released from the holding unit.

According to the airbag device, the inner pressure of the airbag can be reduced (kept adequately without excessive incrementation) by ejecting high-pressure gas within the airbag by the inner pressure adjusting unit being in the full-opened state even when an object (e.g. a passenger on a seat fastening a seat belt or a luggage fixed on a seat) contact with the airbag at the development early stage of the airbag. Therefore, the object to be protected can be restrained adequately by the airbag.

In addition, an object that may be a passenger seated on a seat without fastening a seat belt or a luggage without being fixed on a seat can be can be restrained firmly by the airbag in a vehicle collision because the inner pressure of the airbag can steeply rises after the development start of the airbag due to the full-closed state. Since the object without being fastened or fixed, it may contact with the airbag earlier compared with the case where the object is fastened or fixed. However, the inner pressure of the airbag can be raised quickly compared with the case where the object is fastened or fixed to restrain the object firmly. Furthermore, the airbag devise can provide a secure restraining performance to protect the object even if the object positions near an installation location of the airbag device.

For example, the case where the inflating airbag needs to exert a small reactive force is a case where a passenger is fastening a seat belt and the case where the inflating airbag needs to exert a large reactive force is a case where a passenger is not fastening a seat belt, specifically.

It is preferable that the inner pressure adjusting unit includes a cover protruding outward from the airbag and having a bottom portion, an outer vent hole provided on the bottom portion of the cover, and a valving sheet attached onto an inner surface of the bottom portion and including an inner vent hole offset with the outer vent hole. Here, the one end of the tether belt is connected to the valving sheet.

According to this configuration, the inner pressure adjusting unit can be configured so as to change its aperture efficiency in plural steps according to the development state of the airbag by folding the airbag so as to align the outer vent hole and the inner vent hole. Therefore, the airbag device can be manufactured simply and reduces its manufacturing cost compared with a conventional airbag device with a complicated valving structure.

It is further preferable that the holding unit keeps the other end of the tether belt held in a vehicle collision in case where a seat belt is fastened and releases the other end of the tether belt in a vehicle collision in case where a seat belt is not fastened.

According to this configuration, it can be achieved to follow a very quick operating speed of the airbag device.

It is further preferable that the cover is provided on a front side surface of the airbag being inflated (the front side surface is opposed with a rear side surface facing the passenger) and the holding unit is fixed on a vehicle body.

DETAILED DESCRIPTION OF THE EMBODIMENT

An airbag device for a front passenger's seat of an embodiment according to the present invention will be explained with reference to drawings.

Figure 1:
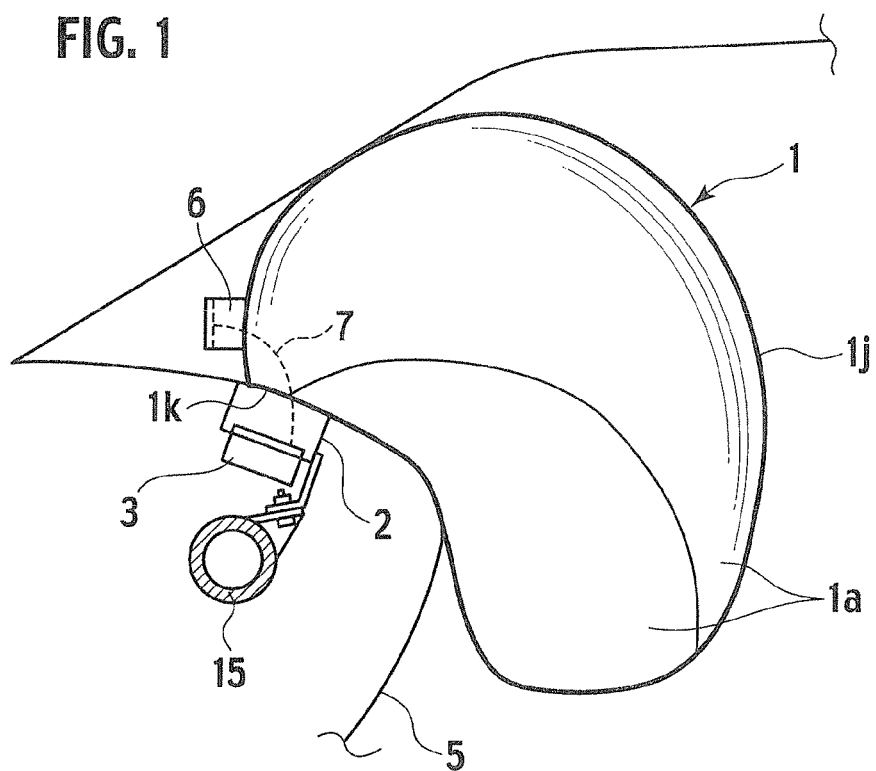
FIG. 1 is a cross-sectional view of an airbag device (its airbag is inflated in a vehicle compartment) according to an embodiment of the present invention.
Figure 2:
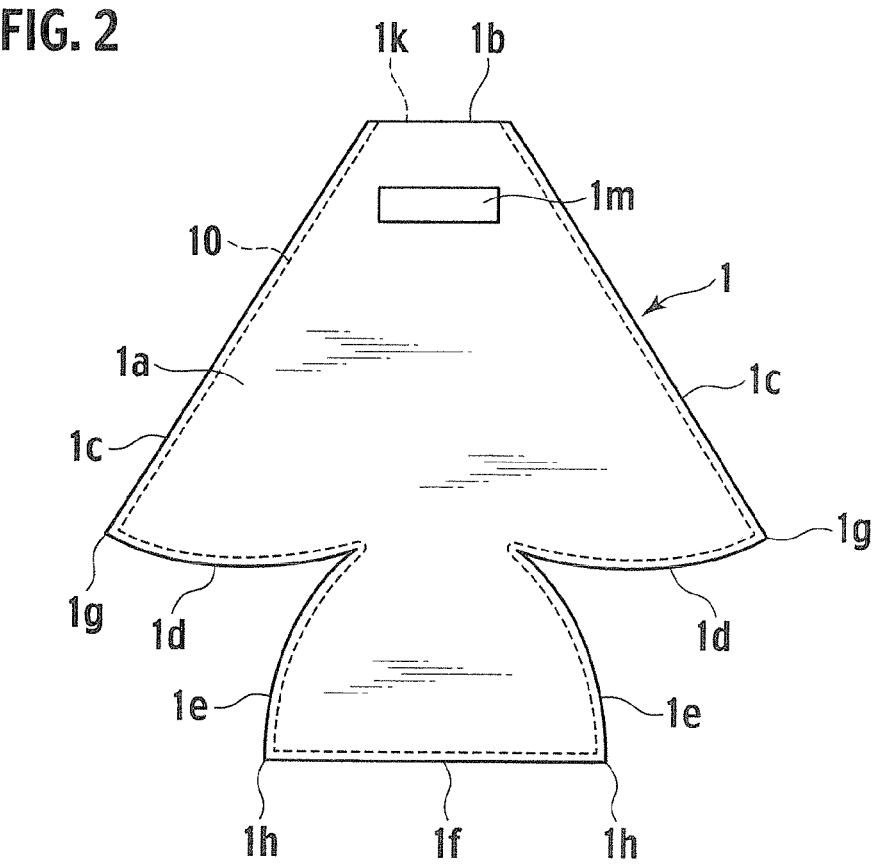
FIG. 2 is an extend view of a base fabric of the airbag in the airbag device according to the embodiment of the present invention.

An airbag 1 shown in FIGS. 1 and 2 is used for an airbag device for a front passenger's seat (not shown) that is installed within an instrument panel 5 in front of the passenger's seat. The airbag 1 has a bag-like shape that is made of plural (e.g. two) air-tight base fabrics 1a. The base fabrics 1a are made by cutting a nylon-coated fabric. The airbag 1 is made by sewing the base fabrics 1a each other along their circumferential edges with strings 10.

Each of the two base fabrics 1a composing the airbag 1 has an almost trapezoidal shape segment as shown in FIG. 2. The trapezoidal shape segment has a front edge 1b located in a front side in a running direction of a vehicle and a pair of side edges 1c extending backward (toward a passenger) from each of both ends of the front edge 1b. The trapezoidal shape segment becomes wider as it goes backward. Each rear end of the side edges 1c connects with a curved side-end edge 1d, respectively.

Each of the two base fabrics 1a also has an almost half-circle shape segment that extends integrally from a rear center of the trapezoidal shape segment. Each center end of the above-mentioned side-end edges 1d connects with a rear-side edge 1e, respectively. The rear-side edges 1e are circumferential edge of the half-circle shape segment and have almost the same curvature as the curvature of the side-end edges 1d. Each length of the rear-side edges 1e is almost the same as each length of the side-end edges 1d.

Rear ends of the rear-side edges 1e connect with a rear edge 1f, respectively. The rear edge 1f bridges each rear end of the rear-side edges 1e. The front edge 1b is parallel to the rear edge 1f. Each corner 1g (connecting the side edge 1c and the side-end edge 1d) and each corner if (connecting the rear edge 1f and the rear-side edge 1e) are made coincident when the side-end edges 1d and the rear-side edges 1e are sewn together with the strings 10, respectively.

An opposing plane toward a passenger under the airbag 1 being inflated is a rear plane (plane for restraining the passenger) 1j. A frontward portion from the rear plane 1j is made gradually smaller. In other words, its cross-sectional area is made gradually smaller. A gas inlet opening 1k is provided at the smallest end (the front edge 1b).

Figure 5:
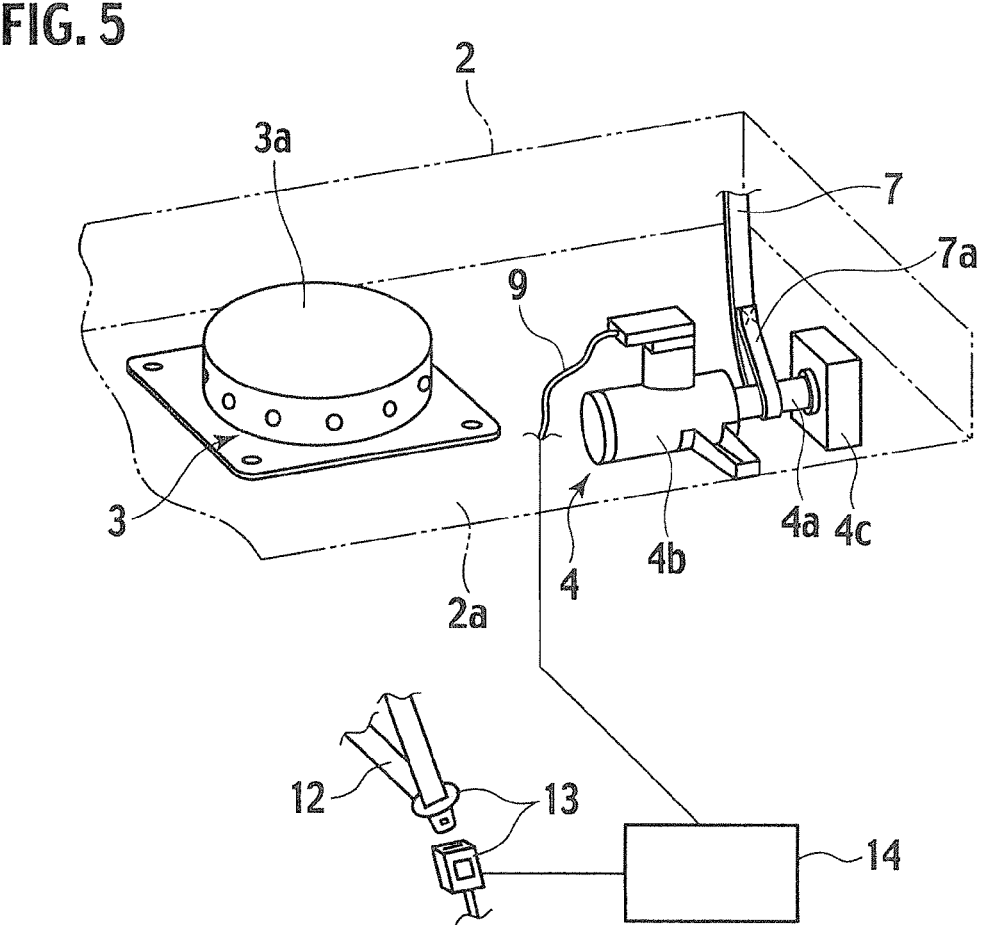
FIG. 5 is a perspective view showing an inflator and its vicinity in the airbag device according to the embodiment of the present invention.

The gas inlet opening 1k is attached to an opening of a case 2 (see FIG. 5) air-tightly. The case 2 accommodates the folded airbag 1. As shown in FIG. 5 an inflator 3 is attached on a bottom plate 2a of the case 2. The inflator 3 ejects high-pressure gas from gas ejection side 3a in a vehicle collision.

For example, the inflator 3 is a disc type inflator and fixed on the bottom plate 2a so as to locate the gas ejection side 3a within the case 2 as shown in FIG. 5. An after-mentioned holding unit 4 is provided on the bottom plate 2a near the gas ejection side 3a.

A rectangular opening 1m is opened on the base fabric 1a that locates upper side under the airbag 1 being inflated. The opening 1m is located an area which is developed at a development early stage of the airbag 1. In other words, the opening 1*m* is exposed at the development early stage. An inner pressure adjusting unit 6 is provided so as to block the opening 1*m*.

The inner pressure adjusting unit 6 adjusts an inner pressure of the airbag 1 with its plural step (a full-opened step, a half-opened step and a full-closed step) during a development process of the airbag 1. The inner pressure adjusting unit 6 has a box-like shape and is made of a nylon-coated fabric similar to the airbag 1. The inner pressure adjusting unit 6 includes a cover 6*a* opened toward the base fabric 1*a*. An opening edge of the cover 6*a* is sewn onto an opening edge of the opening 1*m* air-tightly with strings 11.

Figure 3:
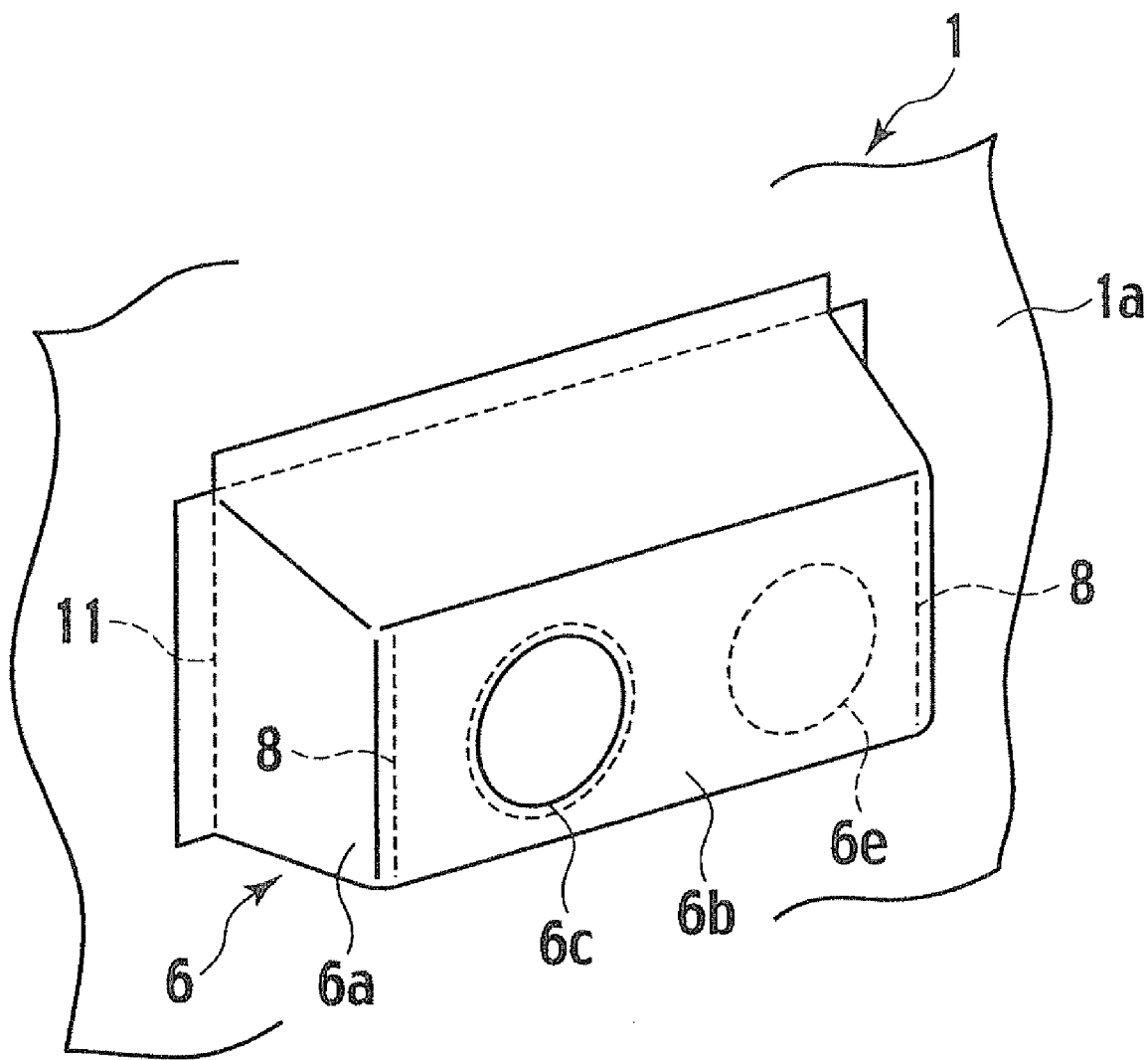
FIG. 3 is an enlarged perspective view of an inner pressure adjusting unit in the airbag device according to the embodiment of the present invention.

An outer vent hole 6*c* is opened on a bottom (bottom portion) 6*b* of the cover 6*a* with being offset (for example, being offset to the left from the center of the bottom 6*b* as shown in FIG. 3). The bottom 6*b* is opposed with the opening 1*m* opened on the base fabric 1*a* of the airbag 1. A valving sheet 6d is provided at an inner side of the bottom 6*b* so as to close the outer vent hole 6*c*.

The valving sheet 6*d* has the same size as the bottom 6*b* of the cover 6*a* and is made of a nylon-coated fabric similar to the cover 6*a*. Both side edge of the valving sheet 6*d* are sewn onto an inner surface of the bottom 6*b* with strings 8. The valving sheet 6*d* will be attached onto the inner surface of the bottom 6*b* intimately when the inner pressure inside the airbag 1 will be led into the cover 6*a* via the opening 1*m*. As a result, the outer vent hole 6*c* will be full-closed by the valving sheet 6*d* as shown in FIG. 3.

In addition, an inner vent hole 6*e* is opened on the valving sheet 6*d* with being offset so as not to match with the outer vent hole 6*c* on the bottom 6*b* (for example, being offset to the right from the center of the bottom 6*b* as shown in FIG. 3).

The inner vent hole 6*e* has almost the same circular shape as the outer vent hole 6*c*. The valving sheet 6*d* will be attached onto the inner surface of the bottom 6*b* intimately when the inner pressure inside the airbag 1 will be led into the cover 6*a*. As a result, the inner vent hole 6*e* will be also full-closed by the valving sheet 6*d* as shown in FIG. 3.

Figure 4:
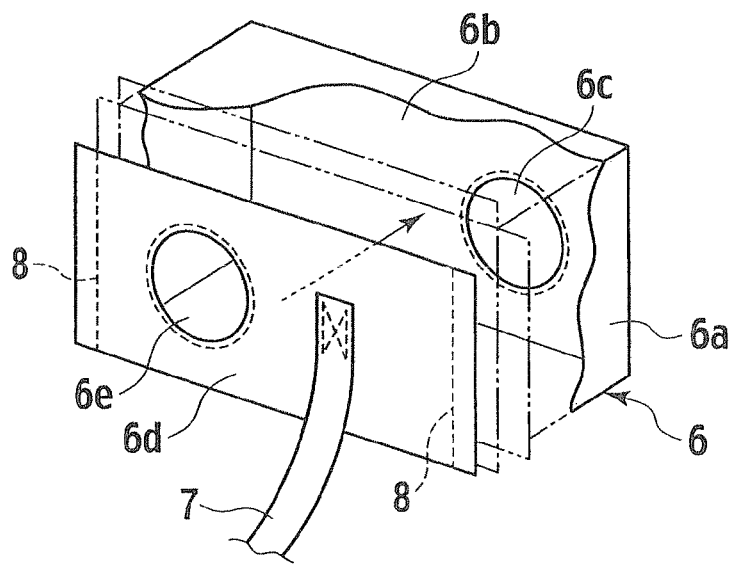
FIG. 4 is an exploded perspective view of the inner pressure adjusting unit according to the embodiment of the present invention.

One end of a tether belt 7 is sewn onto a front surface of the valving sheet 6*d* as shown in FIG. 4. The tether belt 7 is fixed near the center of the valving sheet 6*d*.

The tether belt 7 is made by sewing a fabric such as nylon sheet into a belt. The length of the tether belt 7 is determined so as to make the tether belt 7 tensed when the cover 6*a* of the inner pressure adjusting unit 6 is developed at the development early stage. Another end of the tether belt 7 extends out from the inside of the airbag 1 into the case 2 through the gas inlet opening 1*k*. A ring 7*a* is formed at the other end of the tether belt 7 and hooked (held) by a plunger 4a of the holding unit 4 as shown in FIG. 5.

The holding unit 4 includes an actuator 4*b* that is driven based on a signal from a seat-belt detector 14 (see FIG. 5). The seat-belt detector 14 detects whether or not a seat belt 12 is securely fastened. The plunger 4*a* is reciprocated by the actuator 4*a* and its fore-end is abutted on a stopper 4*c*. The holding unit 4 is fixed on the case 2 and the case 2 is fixed on a vehicle body (steering member) 15 via brackets (see FIG. 1). In other words, the holding unit is fixed on the vehicle body 15.

For example, the actuator 4*b* is a pyro-actuator driven by explosive, an electromagnetic solenoid actuator or the like. The actuator 4*b* hooks the other end of the tether belt 7 under the ordinary state regardless of the signal from the seat-belt detector 14. The actuator 4*b* does not act to keep the tether belt 7 hooked in case where it receives a collision signal from a crash sensor(s) (not shown) and also a signal from the seat-belt detector 14 indicating that the seat belt 12 is fastened. On the other hand, the actuator 4*b* acts to release the tether belt 7 in case where it receives a collision signal from a crash sensor(s) and also a signal from the seat-belt detector 14 indicating that the seat belt 12 is not fastened. When the actuator 4*b* acts, the plunger 4*a* recedes.

Next, behavior of the airbag device 1 will be explained with reference to FIGS. 6 to 10.

The airbag 1 is accommodated within the case after being folded according to a predetermined manner. However, the cover 6*a* of the inner pressure adjusting unit 6 is folded before folding the airbag 1.

Figure 6:
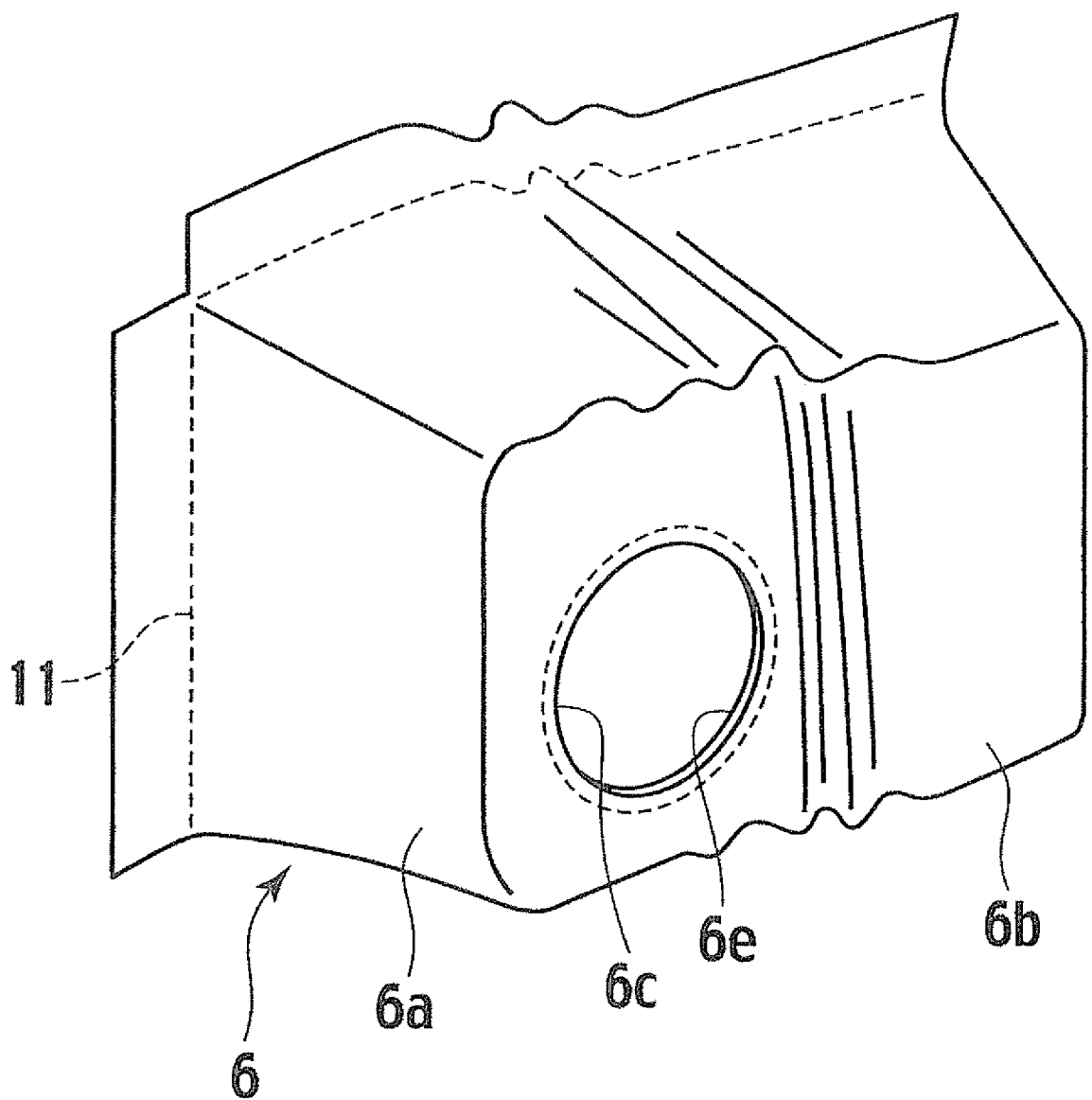
FIG. 6 is a perspective view showing an outside of the folded inner pressure adjusting unit in the airbag device according to the embodiment of the present invention.
Figure 7:
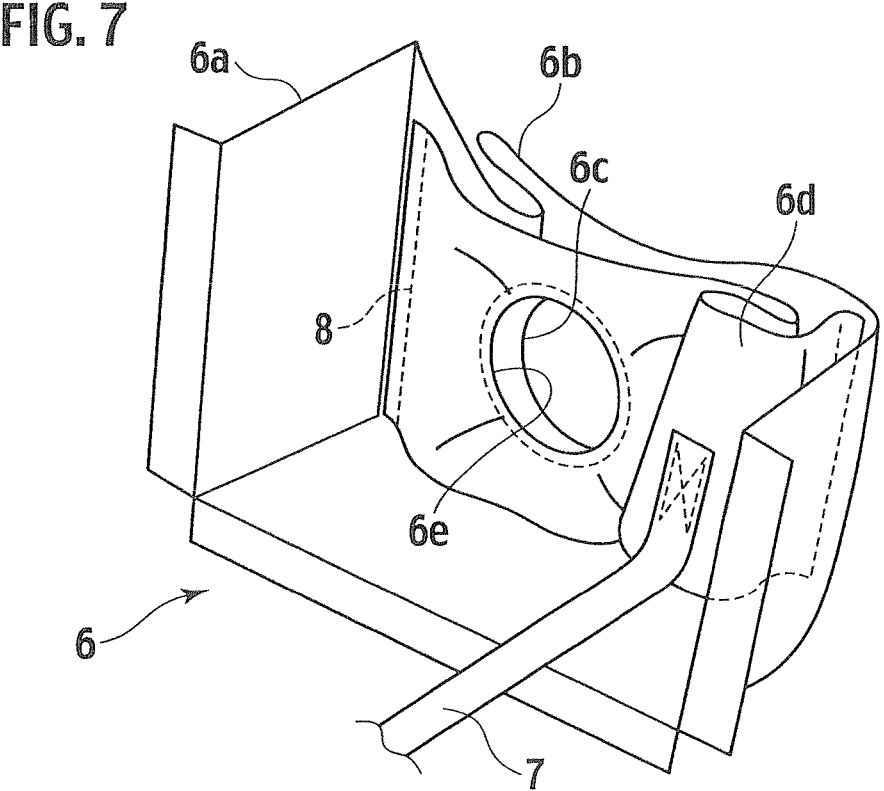
FIG. 7 is a perspective view showing an inside of the folded inner pressure adjusting unit in the airbag device according to the embodiment of the present invention.

First, the cover 6*a* and the valving sheet 6*d* are slacked as shown in FIGS. 6 and 7 so as to match the outer vent hole 6*c* and the inner vent hole 6*e*. And then the airbag 1 is folded into a predetermined folded pattern with keeping the vent holes 6*c* and 6*e* aligned.

The folded airbag 1 is enfolded with a protector (not shown) made of nonwoven fabric or the like after folding the airbag 1 in order to keep its folded state. Further the folded airbag 1 enfolded by the protector is accommodated into the case to assemble the airbag device in which the airbag 1 and the inflator 3 is integrated.

At this time, the tether belt 7 (its one end is sewn onto the valving sheet 6*d* of the inner pressure adjusting unit 6 and its the other end is hooked by the plunger 4*a* of the holding unit 4) is loose within the airbag 1. The assembled airbag device is installed within the instrument panel in front of the front passenger's seat.

When the crash sensor(s) detects a vehicle collision, the inflator 3 is activated based on a signal sent form the crash sensor to eject high-pressure gas from the gas ejection side 3*a* into the case 2.

At this time, if a signal indicating that a seat belt 12 is fastened is supplied from the seat-belt detector 14 via a signal line 9, the actuator 4*b* of the holding unit 4 is not driven. As a result, the other end of the tether belt 7 is kept hooked by the plunger 4*a* of the holding unit 4.

Subsequently, the high-pressure gas ejected into the case enters into the airbag 1 through the gas inlet opening 1*k*. The airbag 1 starts inflating and an airbag module cover (not shown) covering the folded airbag 1 is torn by inflating pressure of the airbag 1. The module cover is torn along its tear line (not shown) so as to form deployment doors and the doors are opened by the inflating airbag 1.

Figure 8:
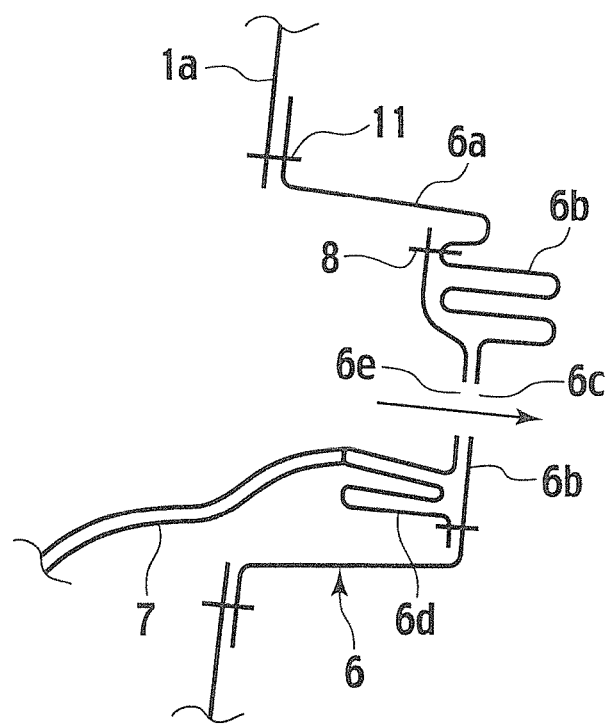
FIG. 8 is an explanatory diagram showing a development process of the airbag in the airbag device according to the embodiment of the present invention.

At the development early stage of the airbag 1, the cover 6*a* is developed as shown in FIG. 8. Since the tether belt 7 is still loose at this time, the outer vent hole 6*c* and the inner vent hole 6*e* are still made aligned and full-opened. Some of the high-pressure gas entered into the airbag 1 is ejected outside of the airbag 1 via the vent holes 6*c* and 6*e*.

Figure 11:
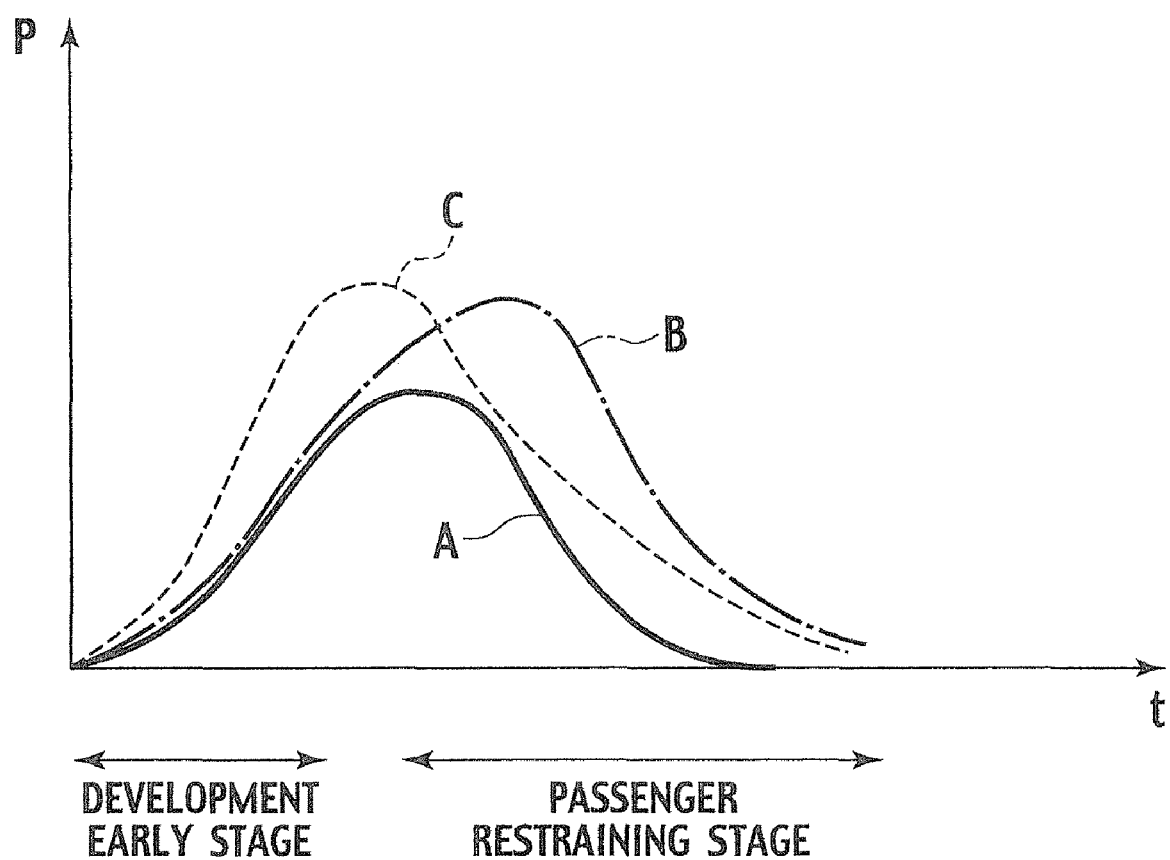
FIG. 11 is a chart showing transition of an inner pressure of the airbag during the development process of the airbag in the airbag device according to the embodiment of the present invention.

The inner pressure of the airbag 1 at the development early stage is reduced as shown by a curve A in FIG. 11 compared with the inner pressure of the conventional airbag (curve B) even if an object has positioned near the installation location of the airbag device and then the object contacts with the airbag 1 at the development early stage. For example, the above-mentioned object may be a passenger seated on a front passenger's seat with fastening a seat belt 12 or a large luggage fixed on a front passenger's seat.

Figure 9:
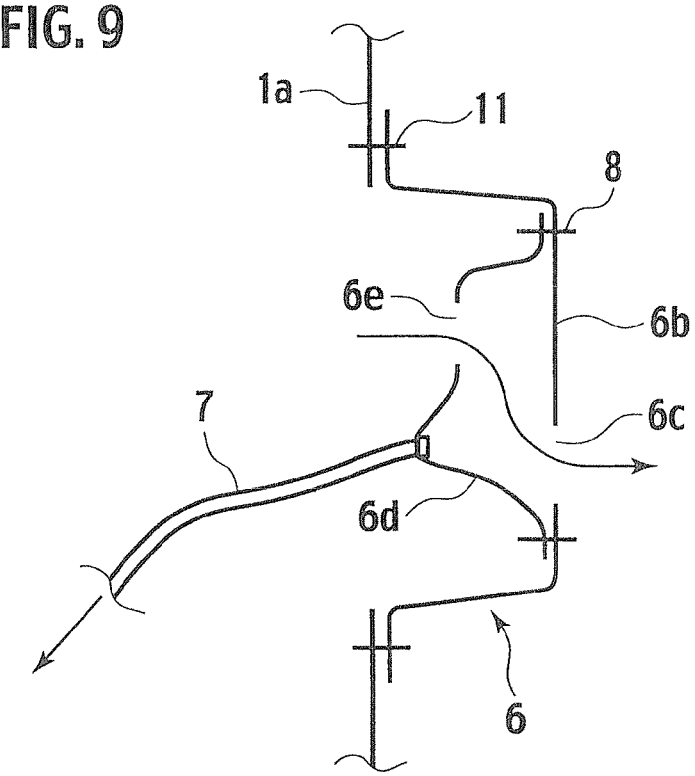
FIG. 9 is another explanatory diagram showing the development process of the airbag in the airbag device according to the embodiment of the present invention.

As the airbag 1 develops further, the tether belt 7 is tensed because the one end of the tether belt 7 is hooked by the plunger 4*a*. Therefore, the center of the valving sheet 6*d* is pulled inward by the tether belt 7 as shown in FIG. 9 and the valving sheet 6*d* is pull away from the inner surface of the bottom 6*b* of the cover 6*a*. As a result, the outer vent hole 6*c* and the inner vent hole 6*e* are made half-opened.

In other words, the high-pressure gas in the airbag 1 passes through the inner vent hole 6e on the valving sheet 6d and then is ejected outside of the airbag 1 from the outer vent hole 6c via a space 6f formed between the valving sheet 6d and the bottom 6b. However, flow resistance is generated when the high-pressure gas passes through the space 6f.

As a result, an ejected amount of the gas reduces due to the flow resistance compared with the full-opened state of the vent holes 6c and 6e. Therefore, the inner pressure adjusting unit 6 is made in a half-opened state to keep the inner pressure of the airbag 1 reasonably.

The inner pressure of the airbag 1 is kept adequately until the rear plane 1j of the airbag 1 restrains the passenger on the front passenger's seat with fastening the seat belt 12 at the development final stage of the airbag 1 shown in FIG. 1. Therefore, the passenger can be restrained adequately by the airbag 1 in a developing final shape.

On the other hand, a signal that a seat belt 12 is not fastened is supplied from the seat-belt detector 14 via a signal line 9 in a vehicle collision when a passenger seats on a front passenger's seat without fastening a seat belt 12 or where a luggage is not fixed on a front passenger's seat. Therefore, the actuator 6b of the holding unit 6 is retracted to release the tether belt 7.

Figure 10:
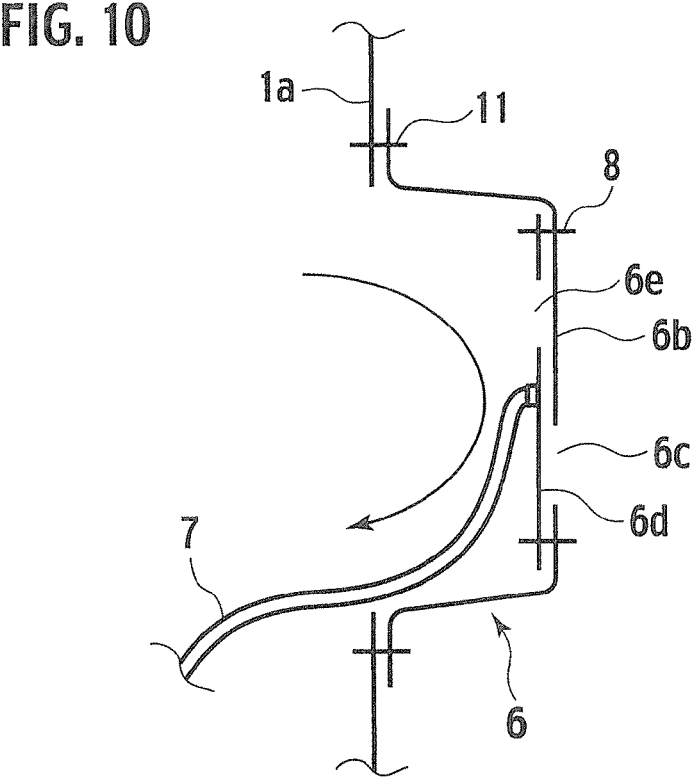
FIG. 10 is yet another explanatory diagram showing the development process of the airbag in the airbag device according to the embodiment of the present invention.

Subsequently, the cover 6a is developed as shown in FIG. 10 after development start of the airbag 1. At this time, the other end of the tether belt 7 is already released.

Therefore, as the development of the airbag 1 proceeds, the valving sheet 6d is attached onto the bottom 6b of the cover 6a due to the high-pressure gas entered into the cover 6a via the opening 1m as the cover 6a develops. As a result, the outer vent hole 6c on the bottom 6b is full-closed by the valving sheet 6d and the inner vent hole 6e on the valving sheet 6d is full-closed by the bottom 6b.

The inner pressure of the airbag 1 rises at the development start of the airbag 1 similarly to the case where a seat belt 12 is fastened but steeply rises from then on as shown by a curve C in FIG. 11. Therefore, an object that positions near the installation location of the airbag device and is not fastened or fixed on a front passenger's seat can be restrained firmly by the rear plane 1j of the airbag 1. For example, the above-mentioned object may be a passenger seated on a front passenger's seat without fastening a seat belt 12 or a large luggage without being fixed on a front passenger's seat. Since the above-mentioned object without being fastened or fixed, it may contact with the airbag 1 earlier compared with the case where the object is fastened or fixed. However, the inner pressure of the airbag 1 can be raised quickly compared with the case where the object is fastened or fixed to restrain the object firmly.

Although the airbag device of the present invention is applied to the airbag device for a front passenger's seat in the present embodiment, the airbag device of the present invention can be applied to another type of an air bag device other than an airbag device for a front passenger's seat.

Although the seat-belt detector 14 detects whether or not a seat belt 12 is fastened to detect a state of the object by detecting whether or not a seat-belt buckle 13 (see FIG. 5) is locked in the present embodiment, an airbag device according to the present invention may be controlled based on another variety of information with respect to detecting a state of an object. For example, it is preferable to detect a passenger's position or a passenger's constitution (a state of an object) for generating an adequate reactive force by an airbag for restraining the object based on a seat slide position, a seat back angle, a load onto a seating surface, a loaded area on a seating surface and so on.

What is claimed is:

1. An airbag device comprising:
    an airbag to be inflated and deployed toward a passenger by high-pressure gas ejected from an inflator upon a vehicle collision;
    an inner pressure adjusting unit provided on the airbag and capable of adjusting an aperture efficiency of at least one vent hole in plural steps according to a deploying state of the airbag;
    a tether belt whose one end is connected to the inner pressure adjusting unit; and
    a holding unit for hooking another end of the tether belt and capable of releasing the other end of the tether belt,
    wherein, in a case where the inflating airbag needs to exert a small reactive force, the inner pressure adjusting unit is made in a full-opened state at a development early stage of the airbag with the other end of the tether belt being held by the holding unit and then the inner pressure adjusting unit is made in a half-opened state until a development final stage of the airbag with the other end of the tether belt being kept held by the holding unit, and,
    in a case where the inflating airbag needs to exert a large reactive force, the inner pressure adjusting unit is made in a full-closed state from a development start to the development final stage of the airbag with the other end of the tether belt being released from the holding unit.

2. The airbag device according to claim 1, wherein the inner pressure adjusting unit comprises
    a cover protruding outward from the airbag and having a bottom portion,
    an outer vent hole provided on the bottom portion of the cover, and
    a valving sheet attached onto an inner surface of the bottom portion and including an inner vent hole offset with the outer vent hole,
    wherein the one end of the tether belt is connected to the valving sheet.

3. The airbag device according to claim 2, wherein the cover is provided on a front side surface of the airbag being inflated, the front side surface being opposed with a rear side surface facing the passenger, and the holding unit is fixed on a vehicle body.

4. The airbag device according to claim 1, wherein the holding unit keeps the other end of the tether belt held in a vehicle collision in case where a seat belt is fastened and releases the other end of the tether belt in a vehicle collision in case where a seat belt is not fastened.

5. The airbag device according to claim 1, wherein the case where the inflating airbag needs to exert a small reactive force is a case where a passenger is fastening a seat belt, and
the case where the inflating airbag needs to exert a large reactive force is a case where a passenger is not fastening a seat belt.

* * * * *